United States Patent [19]

Jircitano et al.

[11] Patent Number: 5,359,889
[45] Date of Patent: Nov. 1, 1994

[54] VERTICAL POSITION AIDED INERTIAL NAVIGATION SYSTEM

[75] Inventors: Albert Jircitano, Grand Island; Daniel E. Dosch, Hamburg, both of N.Y.

[73] Assignee: Textron Inc., Providence, R.I.

[21] Appl. No.: 26,570

[22] Filed: Mar. 5, 1993

Related U.S. Application Data

[63] Continuation-in-part of Ser. No. 805,544, Dec. 10, 1991, Pat. No. 5,339,684.

[51] Int. Cl.$^5$ .............................................. G01C 21/00
[52] U.S. Cl. ................................................. 73/178 R
[58] Field of Search ............. 73/178 R, 178 T, 178 H; 364/443, 453, 460

[56] References Cited

U.S. PATENT DOCUMENTS 3,702,477 11/1972 Brown ......................... 364/453 X Primary Examiner—Richard E. Chilcot, Jr.
Assistant Examiner—Joseph L. Felber
Attorney, Agent, or Firm—Bean, Kauffman & Spencer

[57] ABSTRACT

A vertical position and gravity map aided INS is self contained (no external signals required); covert (no signals emanated); unrestricted in operating area; able to operate in quiet or active gravity regions; and able to be configured with proven instruments.

1 Claim, 1 Drawing Sheet

VERTICAL POSITION AIDED INERTIAL NAVIGATION SYSTEM

This is a continuation-in-part of U.S. patent application Ser. No. 07/805,544 for "Gravity Aided Inertial Navigation System" filed Dec. 10, 1991, now U.S. Pat. No. 5,339,684, which is incorporated herein by reference.

FIELD OF THE INVENTION

This invention relates to inertial navigational systems. More specifically, it relates to an integration of a conventional three axis Inertial Navigation System (INS) with a gravity map and a height/depth sensor.

BACKGROUND OF THE INVENTION

Inertial navigation systems are basically a triad of accelerometers in combination with a triad of gyroscopes which provide acceleration information in a known coordinate frame to a navigational computer. The computer integrates the accelerations in an appropriate navigation reference frame from appropriate initial conditions to provide continuous measures of velocity, position and instrument frame attitude.

The accelerometers measure specific acceleration made up of platform acceleration in linear combination with gravity but since gravity is not perfectly known, an error may develop. This error together with Inertial Navigation System (INS) instrument errors result in navigation solution errors. These navigation errors grow unbounded predominately at or near zero, schuler and siderial frequencies.

The INS vertical position solution is dynamically unstable since the computer must use vertical position and latitude to compute and compensate measured accelerations for normal gravity. Negative feedback results so that vertical position diverges exponentially.

Conventional INS practice is to integrate a height sensor (depth gauge, altimeter, surface ship sea level knowledge) with the INS. The difference between inertial vertical position and that of the height/depth sensor is used to stabilize the inherently unstable vertical channel.

Although the prior art which integrates a conventional three axis strapdown, partially or fully stabilized INS with a height sensor improves navigation performance, it does not fully exploit navigation system velocity error observability. If this velocity error observability (which is significantly enhanced if a gravity field anomaly map is also integrated) is exploited, these errors can be bounded. The anomalous gravity field map can also be used in a map matching mode to bound position error as well.

OBJECTIVES OF THE INVENTION

A primary objective of the invention is to provide an autonomous covert Inertial Navigation System (INS) wherein inertial velocity errors are bounded without external navigation aids or active instrumentation of ground speed.

A further objective of the invention is to provide accurate, self contained navigation with bounded position as well as velocity error by integrating a height (depth) sensor and an anomalous gravity field map with conventional inertial navigation instruments and employing map matching position error control.

A further objective of this invention is an integration scheme which takes advantage of navigation system velocity error observability wherein east velocity error, through the mechanism of vertical Coriolis acceleration, is manifested in observable height (depth) error.

A still further objective of this invention is an integration scheme wherein gravity disturbance vector estimates, based mainly on the anomalous gravity field map, are used to compensate inertial navigation system accelerometer measurements.

SUMMARY

Integration of a height/depth sensor and an anomalous gravity field map with a conventional inertial navigation system (INS) results in an improved navigation system referred to herein as the Vertical Position Aided Inertial Navigation System or VPAINS. Like the conventional INS, VPAINS is autonomous and covert but additionally it has bounded velocity and position error.

The navigation performance improvement of the VPAINS over that of the conventional INS (no gravity map and no height sensor) is attributable to one open loop and two closed loop mechanisms. The gravity map constitutes a consistent set of disturbance vector components and gravity gradients which are accessed at the estimated navigation position. The three disturbance vector components are used to open loop compensate INS accelerometer outputs. After compensating for normal gravity, the resulting improved measure of vehicle acceleration is integrated into vehicle velocity and position.

The two closed loop mechanisms for navigation improvement are manifested in the depth sensor (or known sea level) observation comparison with inertially updated vertical position. One of these mechanisms stems from the fact that vehicle acceleration is generally integrated in a local level frame into velocity and position. Since the local level frame is rotating with respect to inertial space, Coriolis acceleration must be compensated for by using navigation system velocity estimates. A vertical Coriolis acceleration error results from an error in the east velocity estimate which is integrated into vertical velocity and vertical position error. The resulting inertially updated vertical position error will be observed with the height/depth sensor.

The second closed loop mechanism results when the map disturbance vector accessed at the navigator's estimated position is used to compensate INS acceleration measurements. The vertical component of the disturbance vector will in general differ from that at the true position. This error shows up as a vertical acceleration error which integrates into vertical velocity and position error and is observable with the height/depth sensor. To first order this error is related linearly through map gradients to position error so control over system position error is achievable.

This vertical position and gravity map aided INS is self contained (no external signals required); covert (no signals emanated); unrestricted in operating area; able to operate in quiet or active gravity regions; and able to be configured with proven instruments.

DETAILED DESCRIPTION OF INVENTION

Figure 1:
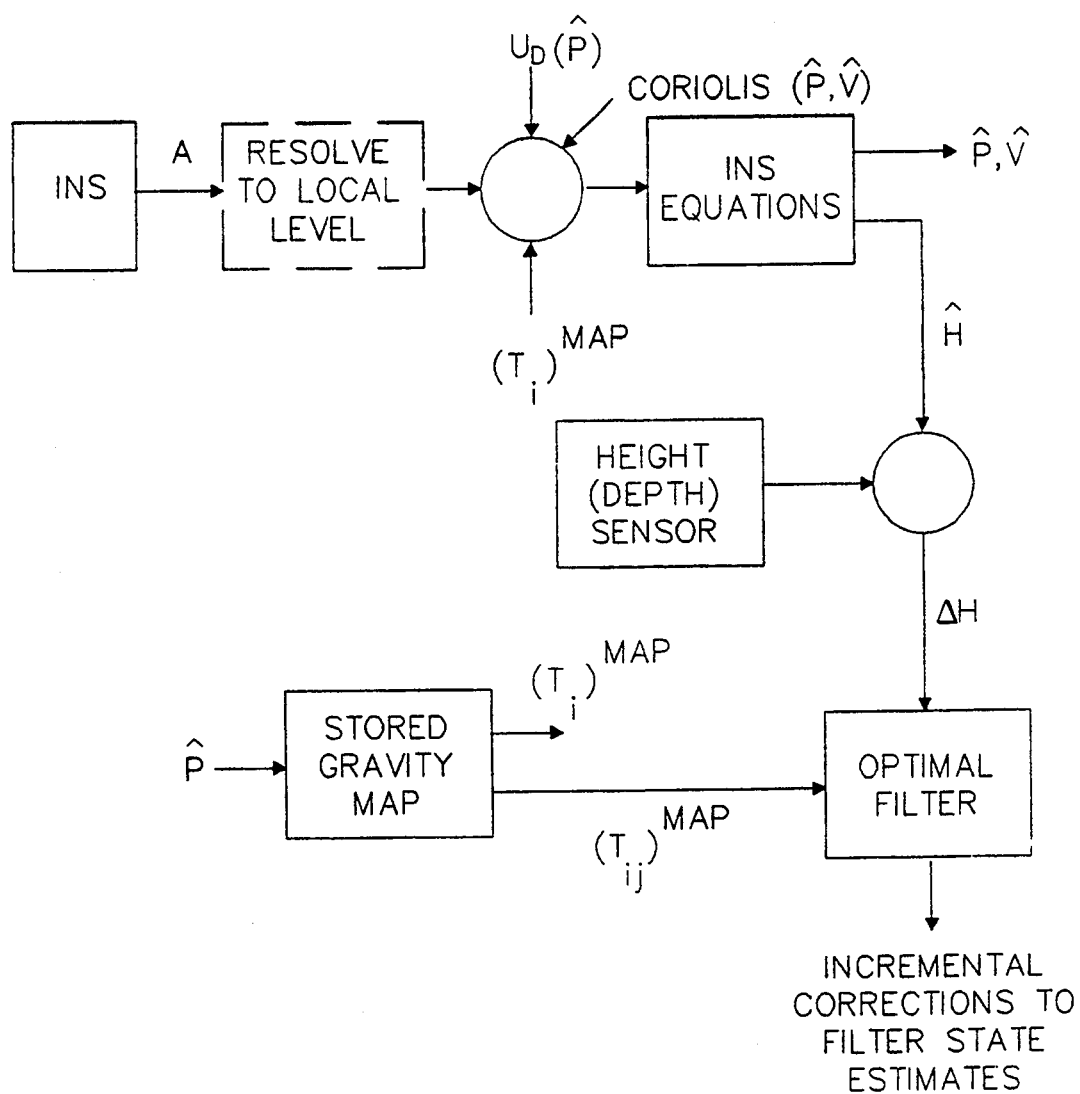
FIG. 1 is a block diagram of a VPAINS implementation simplified to clarify the essential features of the concept.

To clearly present the concept on which the invention is based, gravity field nomenclature and definitions are standardized in the following specification. In all the descriptions that follow a carat ( ^ ) is used to denote the best estimate of some system parameter (i.e. $\hat{V}_N$ means best estimate of North Velocity). A tilde ($\sim$) is used to denote the error in that estimate. Throughout the specification and claims, a height sensor is synonymous with depth sensor and both are vertical position sensors.

GRAVITY FIELD NOMENCLATURE DEFINITIONS

Gravitation is a potential field defined by a scalar potential wherein the anomalous component of the field is given by;

$$T = W - U$$

where:
W = total gravitation potential
U = regular potential associated with an idealized regular earth Spatially differentiating the anomalous potential with respect to north, east, down (NED) coordinates results in the anomalous disturbance vector designated $T_i$ $$T_i = (T_N T_E T_D)' = \begin{bmatrix} \frac{\partial T}{\partial N} & \frac{\partial T}{\partial E} & \frac{\partial T}{\partial D} \end{bmatrix}'$$

denotes transpose.

A single axis accelerometer measures one component of the specific acceleration given by;

$$A = \begin{bmatrix} \frac{\partial^2 R}{\partial t^2} \end{bmatrix}_I - W_i = \begin{bmatrix} \frac{\partial^2 R}{\partial t^2} \end{bmatrix}_I - U_i - T_i$$

$R$ = position

Differentiating the disturbance vector spatially results in the anomalous gravity gradiometer second order tensor designated $T_{ij}$ $$T_{ij} = \begin{bmatrix} T_{NN} & T_{NE} & T_{ND} \\ T_{EN} & T_{EE} & T_{ED} \\ T_{DN} & T_{DE} & T_{DD} \end{bmatrix} =$$

$$\begin{bmatrix} \frac{\partial^2 T}{\partial N^2} & \frac{\partial^2 T}{\partial N \partial E} & \frac{\partial^2 T}{\partial N \partial D} \\ \frac{\partial^2 T}{\partial E \partial N} & \frac{\partial^2 T}{\partial E^2} & \frac{\partial^2 T}{\partial E \partial D} \\ \frac{\partial^2 T}{\partial D \partial N} & \frac{\partial^2 T}{\partial D \partial E} & \frac{\partial^2 T}{\partial D^2} \end{bmatrix}$$

This tensor is symmetric since the order of differentiation does not affect the result. Laplace's constraint applies, therefor the tensor has five independent elements.

VPAINS SYSTEM CONCEPT

The Vertical Position Aided Inertial Navigation System, VPAINS, [see FIG. 1,] consists of a three axis inertial navigation system (INS), a height or depth sensor, and a stored gravity map, (a memory containing data representing a map of gravity anomalies), all three of which include output ports as illustrated in FIG. 1 by electrical function interconnection lines and output arrow heads. The output data on these function lines, i.e. vertical position data, sensed height data and stored gravity anomalies data respectively is applied via matching input ports signified by the illustrated arrow heads to the optimal filter whose function is to integrate the subsystems to produce the best possible navigation (i.e. provide the best estimates of INS position and velocity and instrumentation parameters). The invention is based on the observation that over time, almost all system errors that impact inertial navigation accuracy manifest themselves in the vertical channel of the navigator. If an independent measure of vertical navigation is available, it can be compared with the INS vertical channel and the difference processed to provide better estimates of the system errors. Different INS configurations (e.g. local - level, space stabilized, strap down) lead to different characterizations of system dynamics. A model of these dynamics is required in applying this invention to a specific configuration. Also open to choice is the type of filter used to process measurements (e.g. Kalman filter, non-linear estimator, least squares estimator). The crucial element is knowledge of how overall system errors manifest themselves in the measurements.

Included in the optimal filter is a mechanization of the dynamics of the INS including standard siderial loop, Schuler and vertical channel mechanisms. In this way the propagation of system errors in the navigation channels can be tracked. Of special interest is the dependence of both Coriolis compensation error and vertical gravity estimation error on velocity error. These errors propagate into vertical position error and thus a comparison of INS vertical position with height sensor measurements allows estimation of these INS velocity errors and all other system errors that lead to velocity errors.

EXAMPLE FILTER IMPLEMENTATION (KALMAN FILTER)

In one embodiment of this invention, the optimal filter uses a Kalman filter as the parameter estimation routine. It is to be understood that this embodiment is presented as exemplary only and is not to be construed as limiting the scope of invention. Standard INS state space models give the system formulation required by the Kalman filter. In this embodiment, INS accelerometers are compensated for Coriolis effects (using navigator velocity estimates) normal gravity $U_D$(using navigator position estimates), anomalous gravity ($T_i$)(using the stored gravity map), and instrumentation errors (using filter estimates), and these accelerations are processed to give inertial velocity and position estimates P, $\hat{V}$. The state vector and state uncertainty matrix are transitioned in the standard fashion to the new time and place as estimated by the INS navigator. The Kalman filter output is computed from data derived by differencing inertially updated vertical position data and the height sensor data.

The standard Kalman gain matrix is then calculated. The gains are applied to the height difference. The results are used to improve the system estimates, and the state uncertainty matrix is updated as is standard in a Kalman filter. This procedure is repeated at a rate mostly dictated by the speed of the computer hardware chosen for a given system. When this system reaches steady state, all navigator errors will be bounded. Other versions of this embodiment result if additional navigation aids such as air speed or water speed sensors are also integrated into the navigation system.

Thus a method of inertial navigation is effected where velocity and position error are bounded without external navigation aids or active instrumentation of ground speed by optimally integrating available measurements. This bounding of the velocity and position errors is accomplished by comparing an estimated height (depth) obtained from inertial instruments with an estimate from a height (depth) sensor and combining this with knowledge about the dependence of this difference on system error sources.

Such system configurations and operations as presented herein are by way of explanation and in no way to be considered limiting. Furthermore many other embodiments which will readily be apparent to those skilled in the art may be made without departing materially from the spirit and scope of this invention.

What is claimed is:

1. A navigation system, comprising:
    a three axis inertial navigation system including an inertial vertical position data output port;
    a vertical position sensor including a sensed data output port;
    a gravity anomaly map means comprising a memory containing gravity anomalies data and an anomalies data output port; and
    an optimal filter including input ports connected to said anomalies data output port, said inertial vertical position data output port and said sensed data output port.

* * * * *